United States Patent

Christianson et al.

[15] 3,648,869
[45] Mar. 14, 1972

[54] TRANSFER CARRIAGE
[72] Inventors: Floyd W. Christianson; William J. Oakes; James T. Sawtelle, all of Erie, Pa.
[73] Assignee: American Sterilizer Company, Erie, Pa.
[22] Filed: Nov. 24, 1969
[21] Appl. No.: 879,492

[52] U.S. Cl. .................. 214/515, 280/33.99 R, 280/80 B, 296/35 A
[51] Int. Cl. .......................................... B60p 3/02
[58] Field of Search .................. 214/515–517, 38.8; 280/80, 80 B, 33.99 R, 33.99 I; 296/35 A X

[56] References Cited

UNITED STATES PATENTS

| | | | |
|---|---|---|---|
| 2,010,969 | 8/1935 | Soulis | 214/38 D |
| 2,656,942 | 10/1953 | Helms | 214/515 |
| 3,083,852 | 4/1963 | Lidstrom | 214/515 |
| 3,305,117 | 2/1967 | Ford | 214/515 |

*Primary Examiner*—Albert J. Makay
*Attorney*—Charles L. Lovercheck

[57] ABSTRACT

This disclosure describes a wheeled car especially suited for transporting goods in a hospital or the like. A dolly having front and rear wheels, a cabinet supported on the dolly. The dolly is spaced above the floor so that the dolly can be moved over the car, lifting the wheels of the dolly slightly from the floor for transportation. The car is generally T-shaped having a narrow part and a wider part. The front wheels are carried on a bracket that is slidable from a forward to a rearward position and which is locked in the forward position when the dolly is on the floor. When the car moves under the dolly, the front wheels slide toward the rear of the dolly so that the front wheels of the dolly are all supported adjacent the rear wheels and all four wheels are disposed in the spaces at the sides of the narrow part of the car platform. Thus the overall width of the car, dolly and cabinet is no greater than the cabinet, yet the main part of the car platform is as wide as the bottom of the cabinet.

16 Claims, 11 Drawing Figures

INVENTORS.
FLOYD W. CHRISTIANSON
WILLIAM J. OAKES
JAMES T. SAWTELLE

BY Charles L. Lovendahl
ATTORNEY.

INVENTORS.
FLOYD W. CHRISTIANSON
WILLIAM J. OAKES
JAMES T. SAWTELLE
BY Charles L Lambert
ATTORNEY.

TRANSFER CARRIAGE

STATEMENT OF THE INVENTION

This invention relates to transportation systems and, more particularly, to transportation systems for moving goods from place to place inside a building, such as, for example, hospitals.

OBJECTS OF THE INVENTION

It is an object of the invention to provide an improved transportation system.

Another object is to provide an improved car for transporting goods.

Another object is to provide an improved car dolly and cabinet system.

Another object is to provide an improved car and dolly wherein each of the dolly wheels slides to a position adjacent the other thereby forming a more compact unit with the car.

DETAILED DESCRIPTION OF THE DRAWINGS

Figures 1, 2:
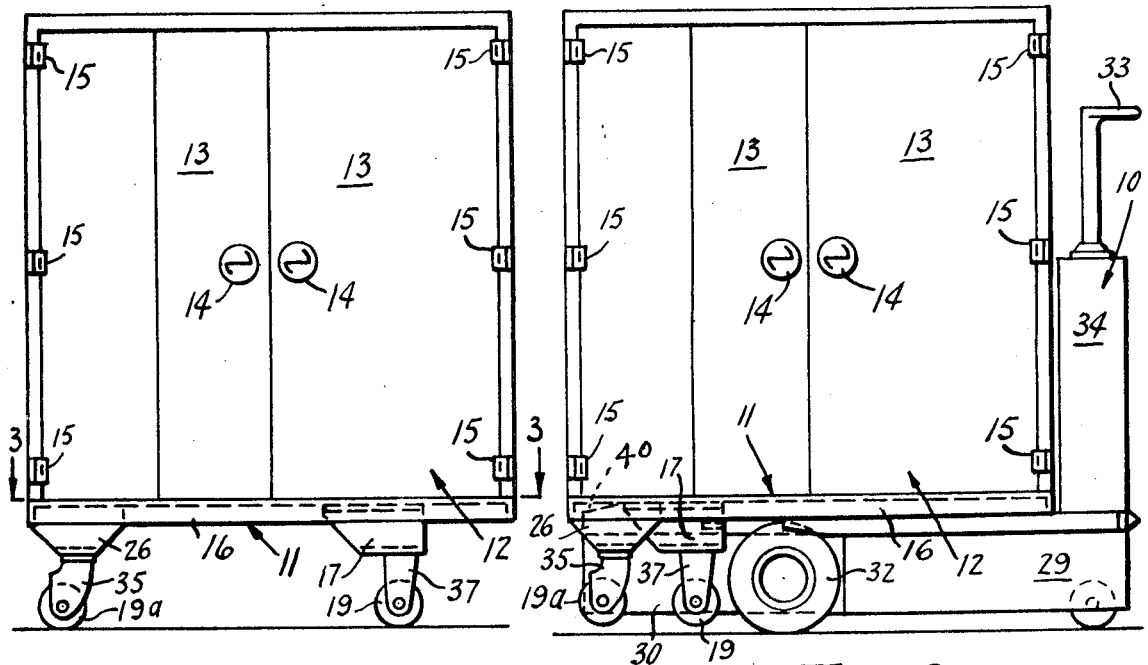
FIG. 1 is a side view of the cabinet on the dolly with the dolly front wheels moved forward to floor engaging operating position.
FIG. 2 is a view showing the dolly on the car.
Figure 3:
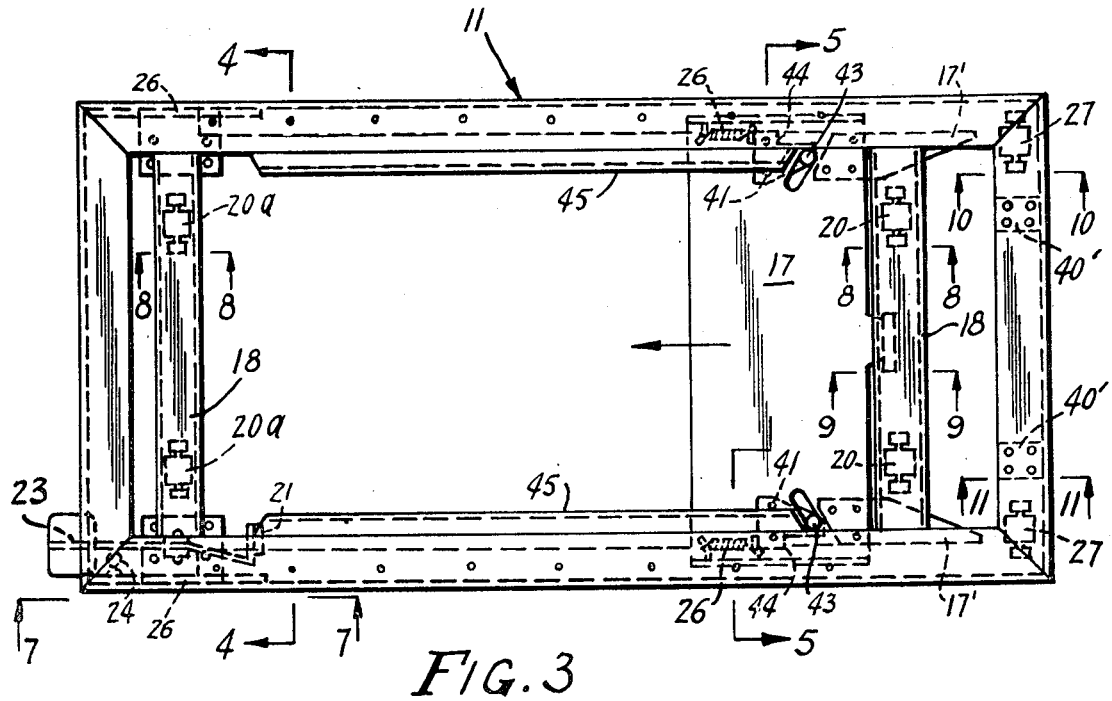
FIG. 3 is a top view of the dolly with the cabinet removed.
Figure 4:
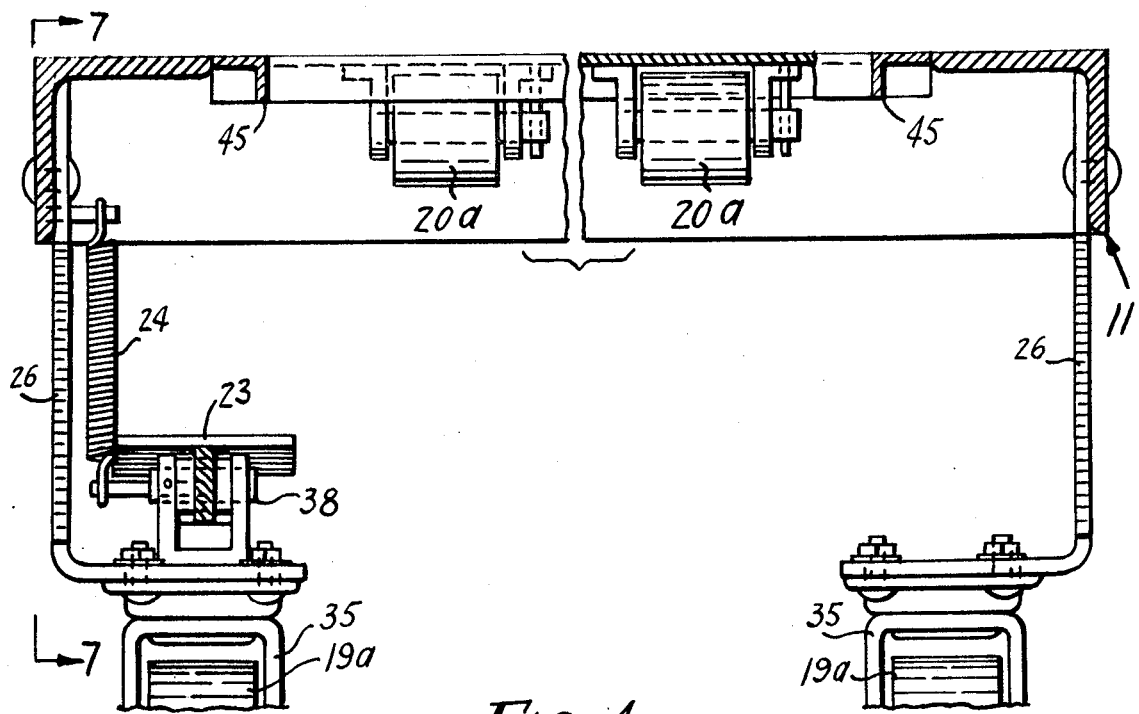
FIG. 4 is a cross-sectional view of the dolly taken on line 4—4 of FIG. 3.
Figure 5:
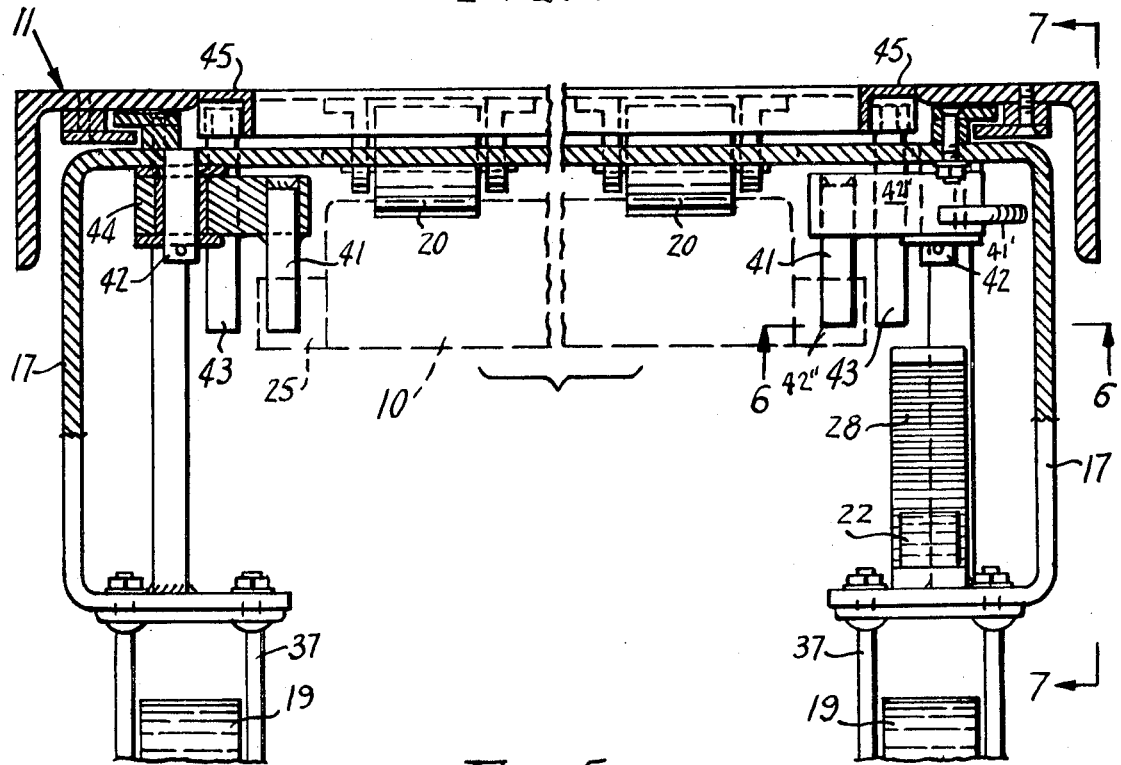
FIG. 5 is a cross-sectional view taken on line 5—5 of FIG. 3.
Figure 6:
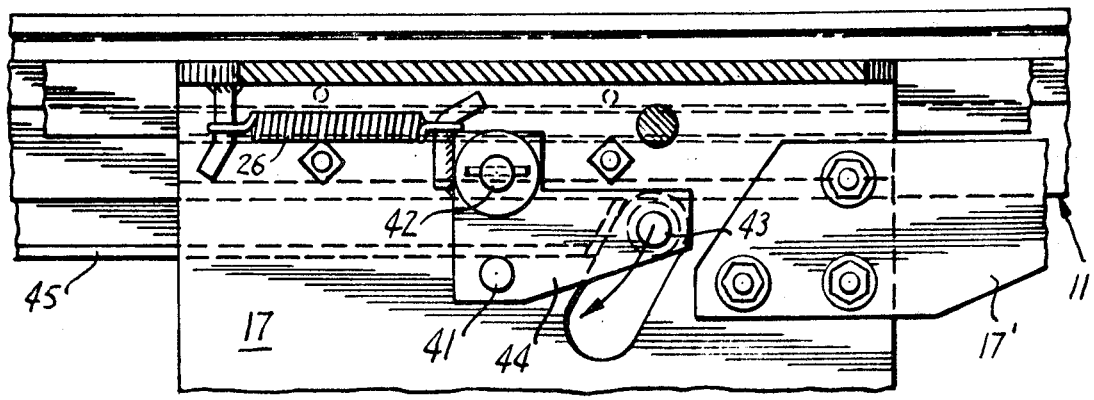
FIG. 6 is an enlarged view of the latch mechanism for holding the front dolly wheels in position.

Now with more particular reference to the drawings, the invention in general is made up of car 10, dolly 11, on which a cabinet 12 is supported. The dolly may be supported on a floor with a cabinet fixed to it, or the cabinet and the dolly may be lifted by the car and transported on the car. The car will be a self-propelled unit, which may either be moved by hand by means of the handle 33, or it could be guided along a track defined by an electrical field which is sensed by radio controls within the control console 34.

The cabinet 12 will preferably be provided with suitable swinging doors 13 that have latches 14 and hinges 15. The cabinet will be fixed to rectangular frame 16 of the dolly by means of suitable bolts or other well known fastening means.

The dolly has the rear wheels 19a which are fixed to the rectangular frame 11 by means of brackets 35, and the rollers 20a are attached to the underside of the frame 11. The rollers 20a are fixed to the cross member 18 of the frame 11. Rollers 20 provide bearing means.

The sliding frame 17 has the front wheels 19 fixed to it by means of the brackets 37. The transverse member 18 in front of the sliding frame has rollers 20 fixed to its undersurface. The rollers 20 and 20a will roll on top of the upper surface of the car 10 when the dolly is moved over the top of the car to the position shown in FIG. 2.

Figure 7:
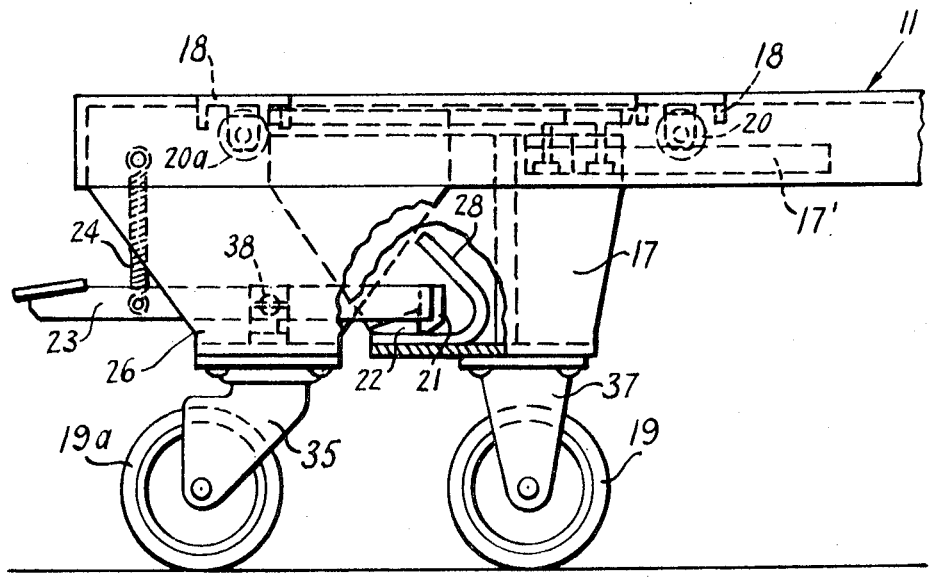
FIGS. 7, 8, 9, 10, and 11 are views taken on lines 7—7, 8—8, 9—9, 10—10, and 11—11, respectively, of FIG. 3.
Figure 8:
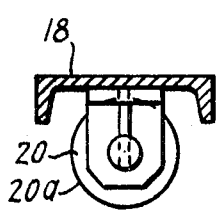
Figure 9:
Figure 10:
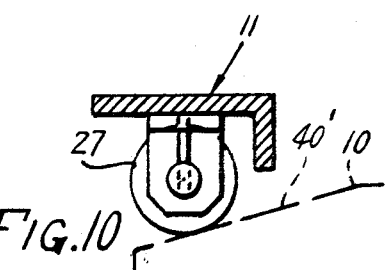
Figure 11:
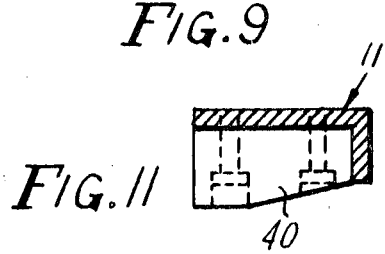

A latch 21 supported on foot pedal lever 23 pivoted to the main frame at 38 has a foot pedal fixed to the outer end of the lever and spring 24 urges the latch into engagement with the keeper 22, which is attached to that portion of the frame which is attached to bracket 35. Thus, when the wheel 19 is moved toward the wheel 19a to the position shown in FIG. 7, the latch 21 will engage the keeper 22 and hold the wheel in this relative position. Inclined bracket 28 is engaged by latch 21 and forces frame 17 away from bracket 35 when pedal 23 is pushed.

DESCRIPTION OF LATCHING DEVICE TO MOVE FRONT WHEELS FORWARD

The car has a platform made up of a generally T-shape having a narrow portion 30 and a wide portion 29. The end of the car platform remote from the console 34 is tapered at 40 so that it will easily slide under the cabinet.

When the cabinet is resting on the dolly with the wheels 19 and 19a resting on the floor in the position shown in FIG. 1, the dolly may be pushed over the car so that the end adjacent wheel 19 slides up over the inclined surface 40 onto the wide part 29 of the car. The sliding frame 17 is released to move rearward when pin 41, which is attached to pivot assembly 42, contacts the actuating member 25 on the car. Continued movement of dolly in the forward direction causes pivot assembly 42 to rotate. During rotation pin 43 which is attached to pivot assembly 42 moves out of its locking position 44 and allows sliding frame 17 to move to the rear. The pivot assembly 42 is spring loaded 26 to return to the locking position 44 whenever possible. When the sliding frame 17 is moving to the rear, this pivot assembly 42 is unable to pivot to its original locking position by an angle 45 attached to the frame 11. Pin 43 guides along angle 45 whenever it is not in locking position 44. The locking means for locking the movable frame on the fixed frame is made up of the lever 42', which acts as a toggle urged by spring 41'. The lever 42', in the form of a toggle, will engage block 42'' and will hold the movable frame in position relative to the truck platform after the fixed frame starts to slide along the top of the truck. The movable frame will be held to the block 42'' until the dolly is slid from the truck and the movable frame has reached its proper position spaced from wheels 19a.

Actuating member 25 on the car was designed to fit between pins 41 and 43 after pivoting. The actuator block 25 attached to the car, therefore, is always captured between pins 41 and 43 whenever pin 43 has unlocked the sliding frame 17. This pivot assembly 42, angle 45 and actuator block 25 are assembled in such a manner as to provide two of each, symmetrically arranged about the centerline of the dolly and car in the direction of travel. The latch 21 which holds the wheels 19 and bracket 37 in the position shown in FIGS. 2 and 7 will be unlatched by stepping on pedal 23. Motion will be initiated by latch 21 contacting slanted surface 28 and the front wheels will be moved back to the position shown in FIG. 2 adjacent the rear wheels of the cabinet as manual force is applied to pull the dolly off the car. Thus, both the front wheels and the rear wheels will be disposed adjacent each other at the side of the narrow portion 30 of the car when the cabinet is in the position shown in FIG. 2. At this position, a car can be readily transported through narrow doors and through narrow hallways.

Tapered blocks 17' are fixed to frame 11 and guide the dolly onto the car.

OPERATION OF THE DOLLY

Starting with the dolly resting on its wheels 19 and 19a on the floor as shown in FIG. 1, when it is desired to load it on the truck, the dolly is moved toward the truck and the each of the fixed frame slides up the incline 40 toward the position the dolly and cabinet occupy in FIG. 2.

The boxes 17', which are fixed to the fixed frame of the dolly, guide the dolly on to the truck platform and rollers 20 and 20a roll along its top. When the pins 41 engage the block 42'' on the sides of the truck, the toggle lever 42 is swung so that pin 43 swings in a position behind the block and, at this point, wheel 19 occupies the position relative to the truck shown in FIG. 2. The dolly and cabinet can then continue to be moved on to the truck platform with the fixed frame 11 sliding relative to the movable frame 18 of the dolly until the wheels 19 and 19a occupy the position shown in FIG. 2 with the dolly and cabinet and disposed adjacent the console 74.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. In combination, a car and a dolly,
said car having a generally T-shaped platform having a top surface with a wide part and a narrow part,
said dolly having front wheels and rear wheels adapted to rest on a floor,
said dolly having a fixed frame and a movable frame,
said front wheels being fixed to said movable frame,
said rear wheels being fixed to said fixed frame,
said wheels supporting said frames above said floor a distance slightly less than the distance from said floor to the top surface of said car platform,
said car being adapted to allow said frames to move over said car and to lift said dolly wheels slightly from said floor,
said movable frame being adapted to slide rearward whereby said front wheels and said rear wheels being disposed at the sides of said narrow part of said car platform when said dolly is supported on said car.

2. The combination recited in claim 1 wherein various configurations of material and personnel handling devices are supported on said dolly.

3. The combination recited in claim 1 wherein said cabinet has a laterally disposed door opening and swinging doors closing said door opening.

4. The combination recited in claim 1 wherein latch means is provided on said dolly for holding said front wheels in position adjacent the end of said dolly remote from said rear wheels when said dolly is off said car and latch means for holding said dolly in position on said car.

5. The combination recited in claim 1 wherein said car has a downwardly inclined end surface on said narrow end,
said dolly having rollers on its bottom adapted to roll on said inclined surface for lifting said dolly from said floor.

6. The combination recited in claim 4 wherein said car has cam members on its sides,
said cam members being adapted to actuate said latch means for holding said dolly on said car.

7. The combination recited in claim 4 wherein said means for holding said front wheels in position adjacent said rear wheels comprises a spring loaded hook swingably supported on said fixed frame,
and a pedal extending from said dolly adapted to be engaged by the foot of an operator for releasing said hook from a keeper on said movable frame.

8. The combination recited in claim 4 wherein means is provided on said dolly for moving said front wheels to the front of said dolly and locking them in position when said dolly is removed from said car.

9. A dolly comprising a fixed frame and a movable frame adapted to be supported on a platform, and a platform,
said fixed frame having first floor engaging wheels fixed to the rear end thereof,
means slidably supporting said movable frame on said fixed frame,
second floor engaging wheels on said movable frame,
and means slidably supporting said movable frame on said fixed frame,
and means for slidably supporting said fixed frame on said platform,
means on said fixed frame to lock said movable frame in position adjacent an end of said fixed frame remote from said first wheels,
and means for unlocking said movable frame from said fixed frame whereby said movable frame may be moved relative to said fixed frame to position said first wheels adjacent said second wheels,
said fixed frame and said movable frame each having bearing means on the bottom thereof for supporting said frames on said platform,
said locking means comprising a toggle member having a lever adapted to be engaged by means on said platform for releasing said locking means and for holding said movable frame fixed to said platform.

10. The dolly recited in claim 9 wherein lever means is provided on said fixed frame with means thereon for locking said movable frame in position adjacent said first wheels.

11. The dolly recited in claim 10 wherein a curved bracket is fixed to said movable frame adjacent said locking means,
and said lever has means thereon for engaging said curved bracket whereby said movable frame is urged away from said fixed frame when said lever is actuated.

12. In combination, a car having a T-shaped platform and third floor engaging wheels, and a dolly for support on said platform,
said dolly having a fixed frame with first wheels and a movable frame with second wheels,
bearing means on said fixed frame for supporting said dolly on said car with said first wheels and said second wheels supported above a floor to be engaged by said floor engaging wheels,
means for locking said movable frame in position spaced from said fixed frame when said dolly is moved from said car,
and means for locking said movable frame in position with said second wheels adjacent said first wheels when said dolly is supported on said car.

13. The combination recited in claim 12 wherein said locking means for locking said movable frame in position with said first wheels spaced from said second wheels comprises,
a lever on said movable frame and means on said lever cooperating with means on said car for unlocking said lever when said dolly starts to be moved from said car and to lock said lever with said movable frame when it reaches its final position relative to said fixed frame as said frame moves from said car.

14. The combination recited in claim 13 wherein said lever is a toggle having a pin,
and means on said car to engage said pin and hold said movable frame in fixed position relative to said car while said dolly is in second position on said car and while said dolly is being removed from said car and to hold said movable frame fixed on said car while said dolly is being removed from said car whereby said movable frame is always adjacent said first wheels when said dolly is completely on said car and said movable frame is always spaced from said first wheels when said dolly is off said car.

15. The combination recited in claim 14 wherein said car has two ground engaging wheels fixed to it adjacent the widest part of said platform whereby said platform extends outward laterally beyond said wheels.

16. A car for transporting a dolly, and a dolly,
said car having a platform having a T-shaped top made up of a wide generally rectangular part forming the bar of said T and a narrower part forming the stem of said T,
at least one floor engaging wheel at the front of said platform,
and at least two floor engaging wheels at the rear of said wide part of said platform,
and said narrow part of said platform extending rearward beyond said wheels a substantial distance whereby said platform may be forced under said dolly,
said dolly having two first floor engaging wheels and two second floor engaging wheels,
means supporting said second floor engaging wheels for sliding whereby said first wheels and said second wheels are disposed in alignment behind said third wheels when said dolly is in position on said car.

* * * * *